US011887793B2

(12) United States Patent
Skuci et al.

(10) Patent No.: US 11,887,793 B2
(45) Date of Patent: Jan. 30, 2024

(54) THREE-POSITION DISCONNECTOR SWITCH

(71) Applicant: ABB Schweiz AG, Baden (CH)

(72) Inventors: Michal Skuci, Brno (CZ); Josef Cernohous, Jamne nad Orlici (CZ); Radek Javora, Hrusovany u Brna (CZ); Tomas Kozel, Brno (CZ); Dietmar Gentsch, Ratingen (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/744,270

(22) Filed: May 13, 2022

(65) Prior Publication Data

US 2022/0367133 A1 Nov. 17, 2022

(30) Foreign Application Priority Data

May 14, 2021 (EP) .................................... 21173957

(51) Int. Cl.
*H01H 3/32* (2006.01)
*H01H 31/00* (2006.01)
*H01H 31/02* (2006.01)
*H01H 31/26* (2006.01)

(52) U.S. Cl.
CPC .............. *H01H 31/26* (2013.01); *H01H 3/32* (2013.01); *H01H 31/003* (2013.01); *H01H 31/026* (2013.01)

(58) Field of Classification Search
CPC .... H01H 31/26; H01H 31/003; H01H 31/026; H01H 31/32; H01H 3/32; H01H 1/36; H01H 1/365; H02B 11/18; H02B 13/045
USPC ..... 200/79, 12, 210, 209, 50.39; 218/12, 55, 218/67, 79, 80, 100
See application file for complete search history.

(56) References Cited

U.S. PATENT DOCUMENTS

| | | | | |
|---|---|---|---|---|
| 6,559,403 B2 * | 5/2003 | Gutalj | H01H 31/24 | 218/43 |
| 6,946,613 B2 * | 9/2005 | Otsuka | H01H 31/32 | 218/78 |
| 7,432,465 B2 * | 10/2008 | Pavlovic | H01H 31/003 | 218/79 |
| 7,759,595 B2 * | 7/2010 | Yoshitake | H01H 31/003 | 218/7 |

(Continued)

FOREIGN PATENT DOCUMENTS

| | | |
|---|---|---|
| EP | 3671789 A1 | 6/2020 |
| EP | 3754681 A1 | 12/2020 |

OTHER PUBLICATIONS

European Patent Office, Extended European Search Report in European Application No. 21173957.8, 6 pp, (dated Nov. 9, 2021).

*Primary Examiner* — William A Bolton
(74) *Attorney, Agent, or Firm* — Leydig, Voit & Mayer, Ltd.

(57) ABSTRACT

A three-position disconnector switch includes a platform, a power in contact, a power out contact, an earthing contact, and a piston. In a first position, the piston contacts the power out contact and the power in contact. In a second position, the piston contacts the power out contact. In a third position, the piston contacts the power out contact and the earthing contact. The piston moves along an axis to transition between the different switch positions. The power in contact is mounted to the platform, the power out contact is mounted to the platform, and the earthing contact is mounted to the platform.

14 Claims, 1 Drawing Sheet

(56) References Cited

U.S. PATENT DOCUMENTS

| | | | | |
|---|---|---|---|---|
| 7,884,298 | B2 * | 2/2011 | Bickel | H01H 31/32 200/519 |
| 9,343,881 | B2 * | 5/2016 | Hyrenbach | H02B 13/045 |
| 2020/0203935 | A1 * | 6/2020 | Kozel | H02B 11/18 |

* cited by examiner

THREE-POSITION DISCONNECTOR SWITCH

CROSS-REFERENCE TO RELATED APPLICATIONS

This patent application claims priority to European Patent Application No. 21173957.8, filed on May 14, 2021, which is incorporated herein in its entirety by reference.

FIELD OF THE DISCLOSURE

The present disclosure relates to three-position disconnector switches and switchgear or control gear for low voltage, medium voltage or high voltage use with a sub station.

BACKGROUND OF THE INVENTION

Using linear three position disconnector switches in a switchgear, such as an air insulated switchgear, creates quality demands regarding mounting and alignment of the contacts.

BRIEF SUMMARY OF THE INVENTION

The present disclosure describes an improved three-position disconnector switch.

The object of the present invention is solved with the subject matter of the independent claims, wherein further embodiments are incorporated in the dependent claims.

In a first aspect, there is provided a three-position disconnector switch, comprising:

- a platform,
- a power in contact,
- a power out contact,
- an earthing contact, and
- a piston.

In a first switch position, the piston makes an electrical contact between the power out contact and the power in contact. In a second switch position the piston makes an electrical contact with the power out contact. In a third switch position the piston makes an electrical contact between the power out contact and the earthing contact. The piston is configured to move along an axis of the three-position disconnector switch to transition the three-position disconnector switch between the different switch positions. The power in contact is mounted to the platform, the power out contact is mounted to the platform, and the earthing contact is mounted to the platform.

In this way, by mounting all the contacts to a single platform the positions of the contacts can be ensured with respect to one another, and the required tolerances of distances between contacts can be ensured, thereby making installation of the disconnector more efficient and less time-consuming.

BRIEF DESCRIPTION OF THE SEVERAL VIEWS OF THE DRAWING(S)

Exemplary embodiments will be described in the following with reference to the following drawings.

DETAILED DESCRIPTION OF THE INVENTION

Figure 1:
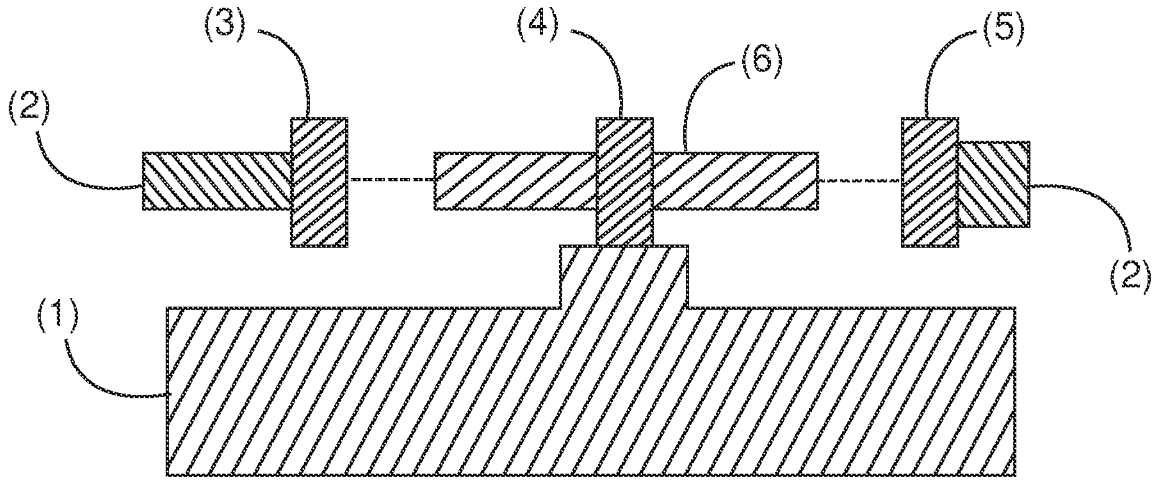
Fig. 1 (Prior Art)
FIG. 1 shows a schematic representation of an existing three-position disconnector switch in accordance with the disclosure.

FIG. 1 shows an existing three-position disconnector switch. In FIG. 1 the following elements are shown: platform 1, contact support 2, bus bar (power in) contact 3, middle (power out) contact 4, earth or earthing contact 5, and a disconnector piston 6.

One shortcoming of the existing switch shown in FIG. 1 is that the independent mounting of disconnector contacts, as shown in FIG. 1, creates a long chain of alignment and separation distance tolerances, and where these tolerances must be very narrow to achieve proper alignment of components and proper operation of the three position disconnector switch. The tolerance chain consists of all components and their dimensions/holes from the power in contact at one side all the way to the earthing contact at the other side. The side contacts—Bus bar (power in 3) and Earth (earthing 5), must be adjusted properly for securing and ensuring the correct disconnector movement and ensuring that the piston correctly reaches it end positions to create proper contact. This arrangement can in theory appear to be easy to achieve, however during transportation and installation of a switchgear on site this alignment can be compromised, and can requires that adjustments be made leading to additional cost.

Figure 2:
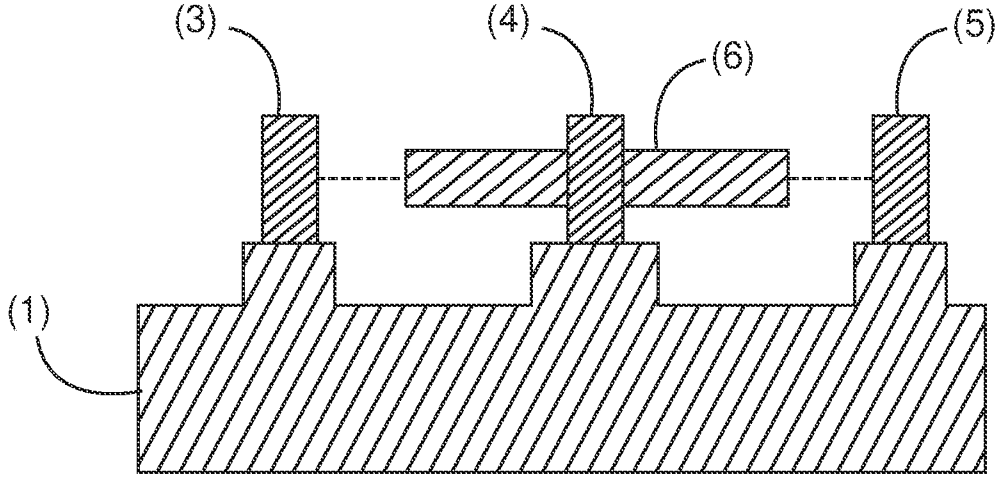
FIG. 2 shows at a schematic representation of a new three-position disconnector switch in accordance with the disclosure.

To address this, an improved switch in accordance with the present disclosure is shown in FIG. 2. In FIG. 2 the following elements are shown: platform 1, which can be part of a circuit breaker pole, bus bar (power in) contact 3, middle (power out) contact 4, earth or earthing contact 5, and disconnector piston 6.

In an example, the new three-position disconnector switch comprises a platform 1, a power in contact 3, a power out contact 4, an earthing contact 5, and a piston 6. In a first switch position, the piston makes an electrical contact between the power out contact and the power in contact. In a second switch position, the piston makes an electrical contact with the power out contact. In a third switch position, the piston makes an electrical contact between the power out contact and the earthing contact. The piston is configured to move along an axis of the three-position disconnector switch to transition the three-position disconnector switch between the different switch positions. The power in contact is mounted to the platform, the power out contact is mounted to the platform, and the earthing contact is mounted to the platform.

In an example, the three position disconnector switch is a single phase disconnector switch.

In an example, to three position disconnector switch is a single phase disconnector switch for a circuit breaker.

In an example, the power in contact is rigidly mounted to the platform.

In an example, the power out contact is rigidly mounted to the platform.

In an example, the earthing contact is rigidly mounted to the platform.

In an example, the power in contact is mounted at a set position with respect to a position at which the power out contact is mounted.

In an example, the power out contact is mounted at a set position with respect to a position at which the earthing contact is mounted.

In an example, the power in contact is mounted at a set position with respect to a position at which the earthing contact is mounted.

In an example, the platform is configured such that a mounting position of the power in contact is at a set position.

In an example, the platform is configured such that a mounting position of the power out contact is at a set position.

In an example, the platform is configured such that a mounting position of the earthing contact is at a set position.

In an example, the platform is rigid.

In an example, the platform is formed from a single piece.

In an example, the platform comprises a dielectric insulating body.

In an example, the platform is formed from an insulated circuit breaker pole.

From the above, it is clear that one or more such three position disconnector switches can be utilized within a low voltage, medium voltage or high voltage switchgear or control gear, and a switch can be utilized with a circuit breaker for example.

Continuing with the new three-position disconnector switch shown in FIG. 2, the new design in which all the contacts are mounted to a robust platform, the alignment problem of disconnector contacts and piston and their long tolerance chain can be avoided. Thus, the contacts can all be mounted to the robust platform that aligns all the components directly and lessens the required tolerances, because the components are securely mounted at their correct positions with respect to separations and with respect to alignment of the piston movement.

Such a platform can be any dielectric insulating body.

The new design in accordance with the disclosure provides a cost effective solution that uses an insulated circuit breaker (CB) pole as a carrier for a disconnector. This creates a complete module capable of opening and closing a circuit breaker (CB) and/or physically disconnecting main power line from main bus bars and/or connects a CB and output to a grounding system.

Such a fixed module is also a fully functional substitution for withdrawable/removable breaker solutions commonly available on market. Thus, retrofitting to existing switchgear/control gear is possible.

Such a mounting of disconnector to a CB pole body also brings benefits of saving production cost (simpler complete module), time and cost of installation SWG on site.

Another benefit is a cost reduction with respect to the original independent contact supports because of their incorporation in the CB body.

The whole module is also less sensitive to production and assembling tolerances due to shorter tolerance chain.

In an example, the power in contact is rigidly mounted to the platform.

In an example, the power out contact is rigidly mounted to the platform.

In an example, the earthing contact is rigidly mounted to the platform.

In this manner, by rigidly mounting the contacts to the platform, it can be ensured that during for example transportation, the contacts will not move with respect one another and the required positional tolerances can be maintained.

In an example, the power in contact is mounted at a set position with respect to a position at which the power out contact is mounted.

In an example, the power out contact is mounted at a set position with respect to a position at which the earthing contact is mounted.

In an example, the power in contact is mounted at a set position with respect to a position at which the earthing contact is mounted.

In an example, the platform is configured such that a mounting position of the power in contact is at a set position.

In an example, the platform is configured such that a mounting position of the power out contact is at a set position.

In an example, the platform is configured such that a mounting position of the earthing contact is at a set position.

In other words, the platform itself can be made with the required tolerances with respect to the positional requirements of the contacts of the 3 position disconnector switch, then the different contacts can be mounted to the platform at these predetermined set positions. Thus, installation and configuration of the three-position disconnector switch is enabled, where the contacts can be mounted to the platform at the ensured correct positions with respect one another.

In an example, the platform is rigid.

In an example, the platform is formed from a single piece.

In an example, the platform comprises a dielectric insulating body.

In an example, the platform is formed from an insulated circuit breaker pole.

Thus, a cost effective solution is provided.

In a second aspect, there is provided a low voltage, medium voltage or high voltage switchgear or control gear comprising one or more three-position disconnector switches according to the first aspect.

The above aspect and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A three-position disconnector switch, comprising:

a platform;

a power in contact;

a power out contact;

an earthing contact; and a piston;

wherein the platform comprises a dielectric insulating body;

wherein, in a first switch position, the piston makes an electrical contact between the power out contact and the power in contact;

wherein, in a second switch position, the piston makes an electrical contact with the power out contact;

wherein, in a third switch position, the piston makes an electrical contact between the power out contact and the earthing contact;

wherein the piston is configured to move along an axis of the three-position disconnector switch to transition the three-position disconnector switch to the first switch position, to the second switch position, or to the third switch position;

wherein the power in contact is mounted to the platform;

wherein the power out contact is mounted to the platform; and wherein the earthing contact is mounted to the platform.

2. The three-position disconnector switch according to claim 1, wherein the power in contact is rigidly mounted to the platform.

3. The three-position disconnector switch according to claim 1, wherein the power out contact is rigidly mounted to the platform.

4. The three-position disconnector switch according to claim 1, wherein the earthing contact is rigidly mounted to the platform.

5. The three-position disconnector switch according to claim 1, wherein the power in contact is mounted at a set position with respect to a position at which the power out contact is mounted.

6. The three-position disconnector switch according to claim 1, wherein the power out contact is mounted at a set position with respect to a position at which the earthing contact is mounted.

7. The three-position disconnector switch according to claim 1, wherein the power in contact is mounted at a set position with respect to a position at which the earthing contact is mounted.

8. The three-position disconnector switch according to claim 1, wherein the platform is configured such that a mounting position of the power in contact is at a set position.

9. The three-position disconnector switch according to claim 1, wherein the platform is configured such that a mounting position of the power out contact is at a set position.

10. The three-position disconnector switch according to claim 1, wherein the platform is configured such that a mounting position of the earthing contact is at a set position.

11. The three-position disconnector switch according to claim 1, wherein the platform is rigid.

12. The three-position disconnector switch according to claim 1, wherein the platform is formed from a single piece.

13. The three-position disconnector switch according to claim 1, wherein the platform is a single dielectric insulating body.

14. The three-position disconnector switch according to claim 1, wherein the platform is formed from an insulated circuit breaker pole.

* * * * *